(12) United States Patent
Daniels et al.

(10) Patent No.: US 7,639,806 B2
(45) Date of Patent: Dec. 29, 2009

(54) FINGERPRINTING DIGITAL DEVICES USING ELECTROMAGNETIC CHARACTERISTICS OF THEIR COMMUNICATIONS

(75) Inventors: Thomas E. Daniels, Boone, IA (US); Mani Mina, Ames, IA (US); Steve F. Russell, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 864 days.

(21) Appl. No.: 11/087,365

(22) Filed: Mar. 23, 2005

(65) Prior Publication Data

US 2005/0213755 A1 Sep. 29, 2005

Related U.S. Application Data

(60) Provisional application No. 60/621,987, filed on Oct. 25, 2004, provisional application No. 60/555,788, filed on Mar. 24, 2004.

(51) Int. Cl.
| | |
|---|---|
| *H04N 7/167* | (2006.01) |
| *H04L 9/30* | (2006.01) |
| *H04L 9/32* | (2006.01) |
| *G06F 21/00* | (2006.01) |
| *G06F 7/04* | (2006.01) |
| *H04L 9/00* | (2006.01) |
| *H04L 9/20* | (2006.01) |
| *G11B 19/02* | (2006.01) |
| *H04K 1/00* | (2006.01) |
| *G08C 19/16* | (2006.01) |
| *H03M 1/00* | (2006.01) |

(52) U.S. Cl. ............... 380/203; 380/247; 380/201; 380/202; 380/200; 713/168; 713/182; 726/4; 726/5; 340/870.21; 341/126; 369/47.35

(58) Field of Classification Search .......... 380/203
See application file for complete search history.

(56) References Cited

U.S. PATENT DOCUMENTS

| | | | | |
|---|---|---|---|---|
| 5,254,843 A * | 10/1993 | Hynes et al. | ............... | 235/449 |
| 5,971,282 A * | 10/1999 | Rollender et al. | ........... | 235/492 |
| 5,974,147 A * | 10/1999 | Cordery et al. | ............... | 705/62 |
| 6,221,051 B1 * | 4/2001 | Hjertman et al. | ............ | 604/189 |
| 6,532,536 B1 * | 3/2003 | Sidie | ............................. | 713/1 |
| 6,970,909 B2 * | 11/2005 | Schulzrinne | ................ | 709/206 |
| 7,255,272 B2 * | 8/2007 | Bedell et al. | ................ | 235/440 |

(Continued)

OTHER PUBLICATIONS

Hall, Jeyanthi et al. "Enhansing Intrusion Detection in Wireless Networks Using Radio Frequency Fingerprinting (Extended Abstract)" 6 pages.

(Continued)

*Primary Examiner*—Syed A. Zia
*Assistant Examiner*—Aravind K Moorthy
(74) *Attorney, Agent, or Firm*—McKee, Voorhees & Sease, P.L.C.

(57) ABSTRACT

Methods and apparatus or systems for providing security based on innate characteristics of devices are disclosed. A method of providing security associated with communications from a digital device includes observing an analog signal associated with communications from the digital device, characterizing the digital device at least partially based on the analog signal, and providing a security feature at least partially based on the step of characterizing.

25 Claims, 7 Drawing Sheets

U.S. PATENT DOCUMENTS

2001/0005823 A1* 6/2001 Fischer et al. ............... 704/205
2002/0044594 A1* 4/2002 Bongfeldt ................... 375/213
2003/0140232 A1* 7/2003 De Lanauze ................ 713/186
2004/0186690 A1* 9/2004 Swanson et al. ............ 702/187

OTHER PUBLICATIONS

"Protection Against Cellular Fraud" 6 pages, www.decodesystems.com Feb. 1999.

* cited by examiner

Confusion Matrix for off-model DFF of 4 tests per cell*

| Expected Card | Tested Card | | | | | | | | | | | | | |
|---|---|---|---|---|---|---|---|---|---|---|---|---|---|---|
| | b1 | | b2 | | | | b4 | | | b5 | | b6 | | bx |
| | c1 | c2 | c1-1 | c1-2 | c2-1 | c2-2 | c1 | c2 | c3 | c1 | c2 | c1 | c3 | c1 |
| b1c1 | 4 | 4 | 0 | 0 | 0 | 0 | 0 | 0 | 0 | 0 | 0 | 0 | 0 | 0 |
| b1c2 | 3 | 4 | 0 | 0 | 0 | 0 | 0 | 0 | 0 | 0 | 0 | 0 | 0 | 0 |
| b2c1-1 | 0 | 0 | 4 | 4 | 0 | 0 | 0 | 0 | 0 | 0 | 0 | 0 | 0 | 0 |
| b2c1-2 | 0 | 0 | 4 | 4 | 0 | 0 | 0 | 0 | 0 | 0 | 0 | 0 | 0 | 0 |
| b2c2-1 | 0 | 0 | 0 | 0 | 4 | 4 | 0 | 0 | 0 | 0 | 0 | 0 | 0 | 0 |
| b2c2-2 | 0 | 0 | 0 | 0 | 4 | 4 | 0 | 0 | 0 | 0 | 0 | 0 | 0 | 0 |
| b4c1 | 0 | 0 | 0 | 0 | 0 | 0 | 4 | 4 | 4 | 0 | 0 | 0 | 0 | 0 |
| b4c2 | 0 | 0 | 0 | 0 | 0 | 0 | 4 | 4 | 4 | 0 | 0 | 0 | 0 | 0 |
| b4c3 | 0 | 0 | 0 | 0 | 0 | 0 | 4 | 4 | 4 | 0 | 0 | 0 | 0 | 0 |
| b5c1 | 0 | 0 | 0 | 0 | 0 | 0 | 0 | 0 | 0 | 3 | 1 | 0 | 0 | 0 |
| b5c2 | 0 | 0 | 0 | 0 | 0 | 0 | 0 | 0 | 0 | 3 | 4 | 0 | 0 | 0 |
| b6c1 | 0 | 0 | 0 | 0 | 0 | 0 | 0 | 0 | 0 | 0 | 0 | 4 | 4 | 0 |
| b6c3 | 0 | 0 | 0 | 0 | 0 | 0 | 0 | 0 | 0 | 0 | 0 | 4 | 4 | 0 |
| bxc1 | 0 | 0 | 0 | 0 | 0 | 0 | 0 | 0 | 0 | 0 | 0 | 0 | 0 | 3 |

*Average of 16 data records

FIG. 6

Confusion Matrix for on-model DFF of 10 tests per cell*

| Expected Card | Tested Card | | | | | | |
|---|---|---|---|---|---|---|---|
| | b5c5 | b5c6 | b5c7 | b5c8 | b5c9 | b5c10 | b5c11 |
| b5c5 | 10 | 0 | 0 | 0 | 0 | 0 | 0 |
| b5c6 | 0 | 10 | 0 | 0 | 0 | 0 | 2 |
| b5c7 | 0 | 0 | 8 | 0 | 0 | 0 | 2 |
| b5c8 | 0 | 0 | 0 | 10 | 0 | 0 | 0 |
| b5c9 | 1 | 0 | 0 | 0 | 10 | 0 | 0 |
| b5c10 | 0 | 0 | 0 | 3 | 0 | 10 | 0 |
| b5c11 | 0 | 0 | 0 | 1 | 0 | 0 | 10 |

FIG. 7

*Average of 83 data records

FINGERPRINTING DIGITAL DEVICES USING ELECTROMAGNETIC CHARACTERISTICS OF THEIR COMMUNICATIONS

CROSS-REFERENCE TO RELATED APPLICATIONS

This application claims priority to U.S. Provisional Patent Application Ser. No. 60/555,788 filed Mar. 24, 2004, and U.S. Provisional Patent Application Ser. No. 60/621,987 filed Oct. 25, 2004, both of which are incorporated by reference herein in their entirety.

BACKGROUND OF THE INVENTION

The present invention relates to security associated with digital devices. More particularly, but not exclusively, the present invention relates to using analog properties of communications associated with digital devices for security purposes. Three general areas of security concerns include digital forensics, intrusion detection, and authentication.

Digital Forensics is a growing field that deals with investigating and prosecuting crimes involving digital storage media and devices. Current methods require that the illicit interaction left a record on the subject device's storage device and that the user had not erased said record.

Intrusion Detection (ID) is the automatic detection of a policy violation in a computer system or network. The subject of ID is widely studied at the layers above the physical layer and in host operating systems and applications. In particular, it is believed that in the 1990s such work was being done in the context of cell phones. However, we are unaware of published work in intrusion detection for consumer security devices. ID is based on the notion of detecting signatures of specific attacks (misuse detection) or detecting variations from a behavior profile of a subject (anomaly detention).

Authentication is the verification of a claimed identity. Traditional authentication involves managing secrets such as passwords or private keys that are later verified. This creates a significant level of administrative overhead in managing keys, key revocation, and/or passwords. Furthermore, if the secret is somehow compromised, the authentication method is compromised until new secrets can be chosen and distributed.

Examples of these security issues are apparent when one considers modern local area networks (LANS). It should be appreciated that the present invention is not limited to use in network devices, however, a discussion of some of these security issues in the context of networks is believed to be helpful in understanding the effect of these security issues. LANs lack strong identification/authentication of devices. Networks are considered to be too easy to connect to. Some network devices use a Media Access Control (MAC) or hardware address associated with the card to ensure that intruders do not substitute devices, but these are trivially defeated by changing the hardware address on the intruding card. In addition, MAC addresses (as well as IP addresses) are notoriously spoofable. Thus, it is difficult to prove that a particular device was involved in an attack.

The growing use of wireless access points adds to the security issues. Wireless access points tempt users to open internal networks to the world and greatly simplify spoofing, making spoofing as easy as "point and click." Moreover, existing wireless access points are often deployed "out of the box" without security features turned on. By one measure, approximately 60 percent of wireless access points are insecure.

Thus, there are numerous problems associated with LAN identity and assurance management. These include detecting unauthorized devices on the network, forensic linkage of devices to records, authentication of device identity, and detection of pending failure/degradation of devices.

SUMMARY OF THE INVENTION

Therefore, it is a primary object, feature or advantage of the present invention to improve upon the state of the art.

It is a further object, feature, or advantage of the present invention to provide a methodology that is applicable to digital forensics, intrusion detection, authentication, and failure prediction.

It is a further object, feature or advantage of the present invention to raise the bar to connecting unauthorized devices by using innate characteristics associated with the outputs of physical devices instead of easily modifiable digital addresses.

Another object, feature, or advantage of the present invention is to use physical measurements of data link behavior to determine or verify identity and assure health of devices.

A still further object, feature or advantage of the present invention is to provide a security measure that includes analog metrics.

Another object, feature, or advantage of the present invention is to provide profiles of authorized devices on a network.

Yet another object, feature, or advantage of the present invention is to provide for alerting management of intruders on a network who have a profile different from the profiles associated with authorized users.

A further object, feature, or advantage of the present invention is to provide for detecting unauthorized devices on a network.

A still further object, feature, or advantage of the present invention is to provide for forensic linkage of devices to records.

Another object, feature, or advantage of the present invention is to store device fingerprints for evidentiary analysis.

Yet another object, feature, or advantage of the present invention is to provide for authentication of device identity.

A further object, feature, or advantage of the present invention is to provide for using device fingerprints to allow or disallow access to network resources.

A still further object, feature, or advantage of the present invention is to provide for detection of pending failure and/or degradation of devices.

Another object, feature or advantage of the present invention is to provide a methodology for detecting and/or preventing unauthorized use of a network by someone with physical access to the network.

One or more of these, and/or other objects, features, or advantages of the present invention will become apparent from the specification and/or claims that follow.

The present invention provides for security by examining the analog behavior of a device's communication that results from variations in the innate electrical characteristics of outputs associated with physical devices. Thus, an attacker would have to make hardware adjustments that require knowledge of the expected signal in order to defeat the security. This is extremely difficult and very expensive to do.

According to one aspect of the present invention, a method for providing security associated with communications from a digital device is disclosed. The method includes observing an analog signal associated with communications from the digital device, characterizing the digital device at least partially based on the analog signal, and providing a security feature at least partially based on the step of characterizing. The step of characterizing can include performing any appropriate analysis of the analog signal.

According to another aspect of the present invention, an apparatus or system for providing security related to communications from a digital device is disclosed. The apparatus or system includes an input from the digital device for receiving an analog signal associated with the digital device. The apparatus or system also includes a data link as well as a signal analysis component for providing an analysis of the analog signal associated with the digital device. The apparatus or system also includes a decision component for characterizing the analysis of the analog signal associated with the digital device and determining whether or not to activate a security feature determined by the policy functions of the invention. The signal analysis component and/or the decision component can at least partially be implemented in software.

According to another aspect of the present invention, a method for providing security is disclosed. According to this method, communication from a digital device is observed. Analog metrics associated with the communication are determined. A security measure is then applied based on the analog metrics. The security measure can be of any number of varieties and can include, without limitation, intrusion detection, forensic data collection, authentication, and identification.

According to another aspect of the present invention, a system for providing security is disclosed. The system includes a controlled device having a controlled interface to a medium, an analog-to-digital converter operatively connected to the controlled interface for receiving an analog signal and providing digital samples, a data selection and reduction component operatively connected to the analog-to-digital converter for receiving the digital samples and selectively storing selected or reduced digital samples within a storage component, an analysis component for analyzing the digital samples, and a policy component for making decisions based on output from the analysis component. The data selection/reduction component can perform data selection and reduction in various ways. The analysis component can perform analysis in any number of ways. The policy component can make any number of decisions in any number of ways.

DETAILED DESCRIPTION OF THE PREFERRED EMBODIMENT

The present invention provides for security by examining the variations in network signaling that result from variability of the innate characteristics of physical devices. More particularly, but not exclusively, the present invention provides for examining analog properties of a communication associated with a digital device. This allows the digital device to be characterized in a particular manner and for a security feature or service to be implemented based on the characterization of the digital device. Thus, an attacker would have to make extremely difficult and expensive hardware adjustments that require knowledge of the expected signal in order to defeat the security.

The present invention provides for security by observing analog signals associated with a digital device. Network devices are of particular interest, however, the present invention is in no way limited to network devices and also contemplates that security can be added to other types of digital devices, including smart cards, smart card readers, and RFID tags.

By sampling analog signals emitted by digital devices and comparing these signals to a stored "finger print" and corresponding digital representation or providing other types of analysis, a wide range of security features or services can be provided. Overcoming such security features or services would require physical modification of the subject device which significantly raises the bar for authorized access. Similar methods can also be used to detect tapping in wired networks and the location of attackers in wireless networks. The same method can also detect when cables are changed and when an authorized card is changed from an authorized computer to an unauthorized computer. The analog signals can be associated with wired ethernet cards, switches, wireless ethernet cards, wireless access points, smart cards, smart card readers, RFID tags, and any number of other devices.

According to the present invention, an analog signal associated with one or more digital devices is observed and analyzed appropriately to characterize the one or more digital devices. It should be understood that the true analog characteristics would be impossible to find due to measurement bandwidth limitations. The metrics used, however, can be defined based on a practical representation of analog characteristics. What one may consider as practical is based on operating conditions and speed and can be determined via a feedback process based on the metric that is being created. The present invention provides for observing the electromagnetic characteristics associated with an output from a digital device. The electromagnetic characteristics include signal detection via high speed detection path provided to a probe which is preferably designed to keep signal integrity over the operating bandwidth. The one or more digital devices being observed and analyzed may be associated with a network. A resulting characterization allows appropriate security features or services, including forensic data collection, intrusion detection, and authentication/identification, and failure prediction.

The present invention contemplates that analysis of analog signals can be performed in any number of ways. For example, the analysis can include pattern recognition techniques, cross-correlation comparison, amplitude and power spectrum comparison, matched filter detection, wavelet analysis, and differential spectral analysis and any number of other signal processing methods. The present invention also contemplates that this analysis can include analytic modeling of signal components and signature behavior. The present invention is not limited to any particular type of analysis or any particular technique or set of techniques. Rather, the present invention contemplates that any number or types of analysis can be performed. The type of analysis performed may depend upon particular characteristics of the analog signal, the properties of the analog signal of most interest, the type of digital device or other considerations as may be appropriate in a particular situation.

One specific embodiment of the present invention that has already been implemented is the differentiation between the types of network card used on a network. The differentiation boasts greater than 99 percent accuracy, a two frame learning period, and detection of frames from other manufacturers' cards in only one frame or data record.

Digital Forensics

The forensic applications are primarily related to finger printing, but may also involve other signal characteristics such as directionality and multipath. The present invention provides an entirely new capability in digital forensics by allowing a technician to link a device to an earlier interaction with a controlled device based on physical characteristics of the device. Minimally, a Controlled Device of the present invention records fingerprints for every unique subject encountered during a set time window. The storage unit would maintain records of the fingerprints for each time window until an analysis is requested. Additionally, some digital information such as hardware addresses might be stored by the storage unit. The data would remain in storage until it has been purged or archived.

The stored data would be used when an unusual event occurs. Such an event could be a criminal or internal investigation of an attack that appeared to pass through the controlled device. The forensic methodology in this case would be to identify suspects and acquire their devices for analysis. By collecting new measurements of the device and comparing them to stored fingerprints, the analysis module could report past interactions with the suspected device. It could also give statistical confidence measures of the fit.

Key element of forensic applications of the present invention is its resistance to false matches in analysis and the integrity of stored fingerprints. Resistance to false matches is an aspect of our work in constructing and evaluating fingerprints described in later sections. The integrity of stored information is an issue of interest in the policy and usage frameworks portion of this application.

Intrusion Detection

Intrusion Detection (ID) is the automatic detection of a policy violation in a computer system or network. The subject of ID is widely studied at the layers above the physical layer and in host operating systems and applications. However, we are unaware of published work in intrusion detection for consumer security devices as the present invention accommodates. ID is based on the notion of detecting signatures of specific attacks (misuse detection) or detecting variations from a behavior profile of a subject (anomaly detention).

The present invention provides for various approaches, including both anomaly and misuse detection approaches. Finger printing is a form of anomaly detection in the sense that the fingerprint is a behavior profile for a given device. The fingerprint is learned in the Data Selection/Reduction Component and stored for later analysis. In this case, the Analysis Component will compare stored fingerprints to a current fingerprint to detect impostor devices or changes in their physical configuration. This analysis occurs on-line as opposed to the off-line processing in many forensics applications. The Policy Component may act to stop a detected attack by sending commands to the Management Function of the Controlled Device or report the attack to an administrator.

A misuse detection approach can detect set signal characteristics that indicate a malicious tap is present on a line or unusual multipath behavior perhaps indicating wardriving in wireless networks.

Authentication

Authentication is the verification of a claimed identity. Traditional authentication involves managing secrets such as passwords or private keys that are later verified. This creates a significant level of administrative overhead in managing keys, key revocation, and/or passwords. Furthermore, if the secret is somehow compromised, the authentication method is compromised until new secrets can be chosen and distributed.

In some environments such as wireless network LANs, the present invention may provide a solution to this problem. If wireless access points can determine the identity of a remote wireless device with sufficient fidelity using analog characteristics specific to the device, it may be possible to rely on the present invention for authentication. Certainly, the present invention can be used as a second line of defense in addition to more traditional cryptographic methods. In authentication, a device's fingerprint can be learned by the Data Selection/Reduction component before it is put into service. Devices can then do online evaluation of the fingerprint in the Analysis Component and decide if the device was authorized or not. This is a potentially "risky" application of the present invention as false positives could cause a denial of service and false negatives would grant access to unauthorized devices.

Figure 1:
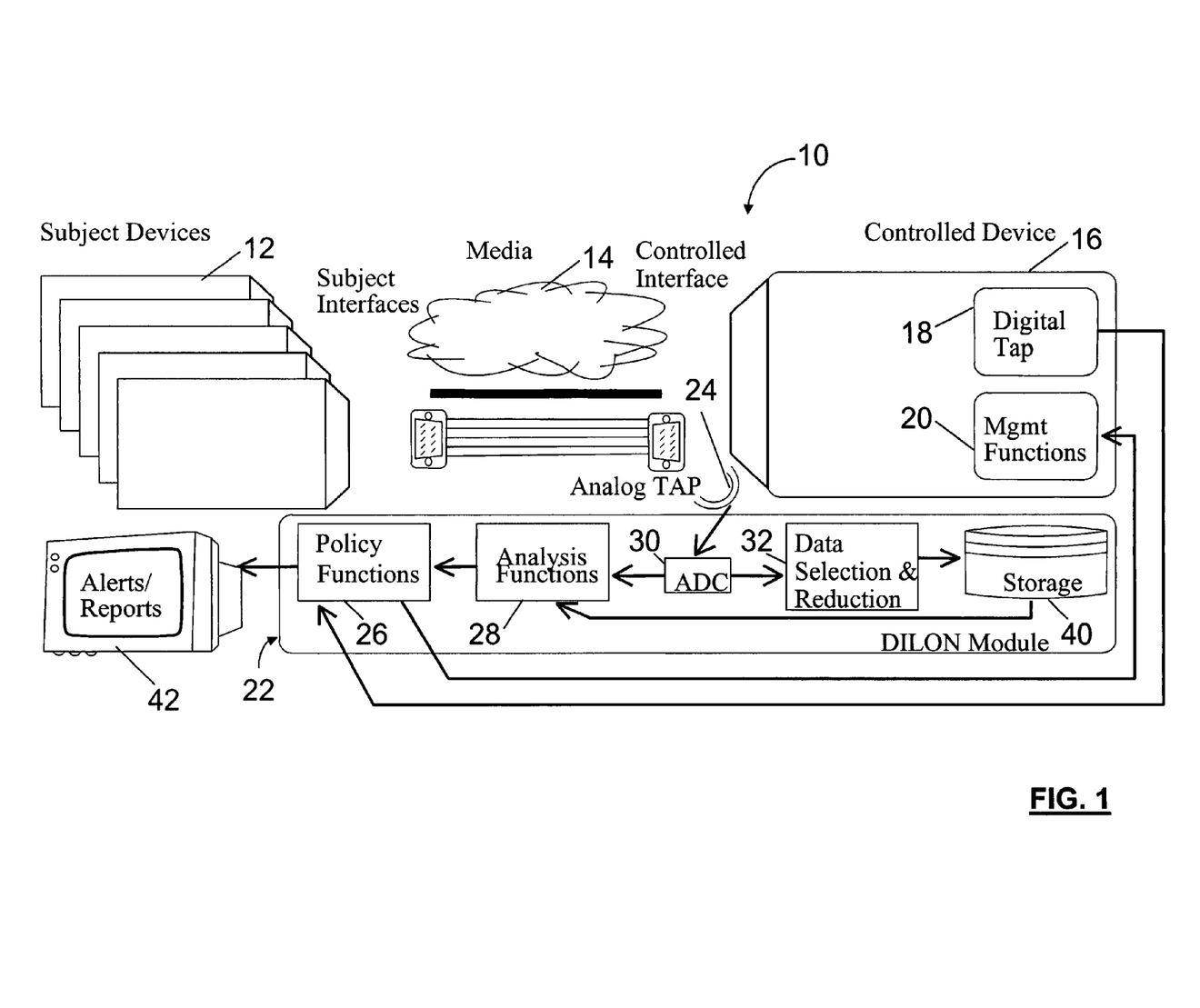
FIG. 1 is a diagram illustrating one embodiment of a system in a general local area network environment according to the present invention.

FIG. 1 illustrates an overview of one embodiment of the present invention. According to this embodiment of the present invention, a system 10 includes a controlled device 16 which directly communicates with multiple subject devices 12 over a media 14. The present invention contemplates that any number of types of media 14 can be used, including both guided and non-guided electromagnetic mediums. There is a controlled interface such as a passive analog tap 24 for collecting analog signals associated with outputs of the subject devices 12. The controlled interface provides an interface to a controlled device 16. The signals collected at the analog tap 24 are fed to the analog-to-digital converter 30. The present invention contemplates that the analog tap 24 may also perform other signal conditioning functions including, but not limited to, frequency translation and amplification. The present invention contemplates that the analog tap 24 can, but need not, be integrated into the controlled device 16.

The analog-to-digital converter 30 samples the analog signals and outputs streams of digital voltage samples. The Data Selection/Reduction Component 32 and Analysis Component 28 read these samples for their processing. The Data Selection/Reduction Component 32 selects samples from the ADC 30 and creates output to the Storage Component 40 for later analysis. The Analysis Component 28 reads samples from the ADC 30 for analyses which may include comparison with historical data from the Storage Component 40. Finally, the Policy Component 26 makes decisions about potential actions based on the output of the Analysis Component 28 and digital data from the Controlled Device 16. The Policy Component 26 can act by reporting an alert or by interacting with the management functions of the Controlled Device 16. It should be understood that the present invention contemplates that the components of the present invention can perform their functions in any number of ways. The present invention contemplates variations in the manner is which data is selected and/or reduced, the manner in which data is analyzed, and the manner in which data is stored. The present invention further provides for variations in the actions taken by the Policy Component 26. The particular variations used will depend upon the particular application and environment in which the invention is used.

Figure 2:
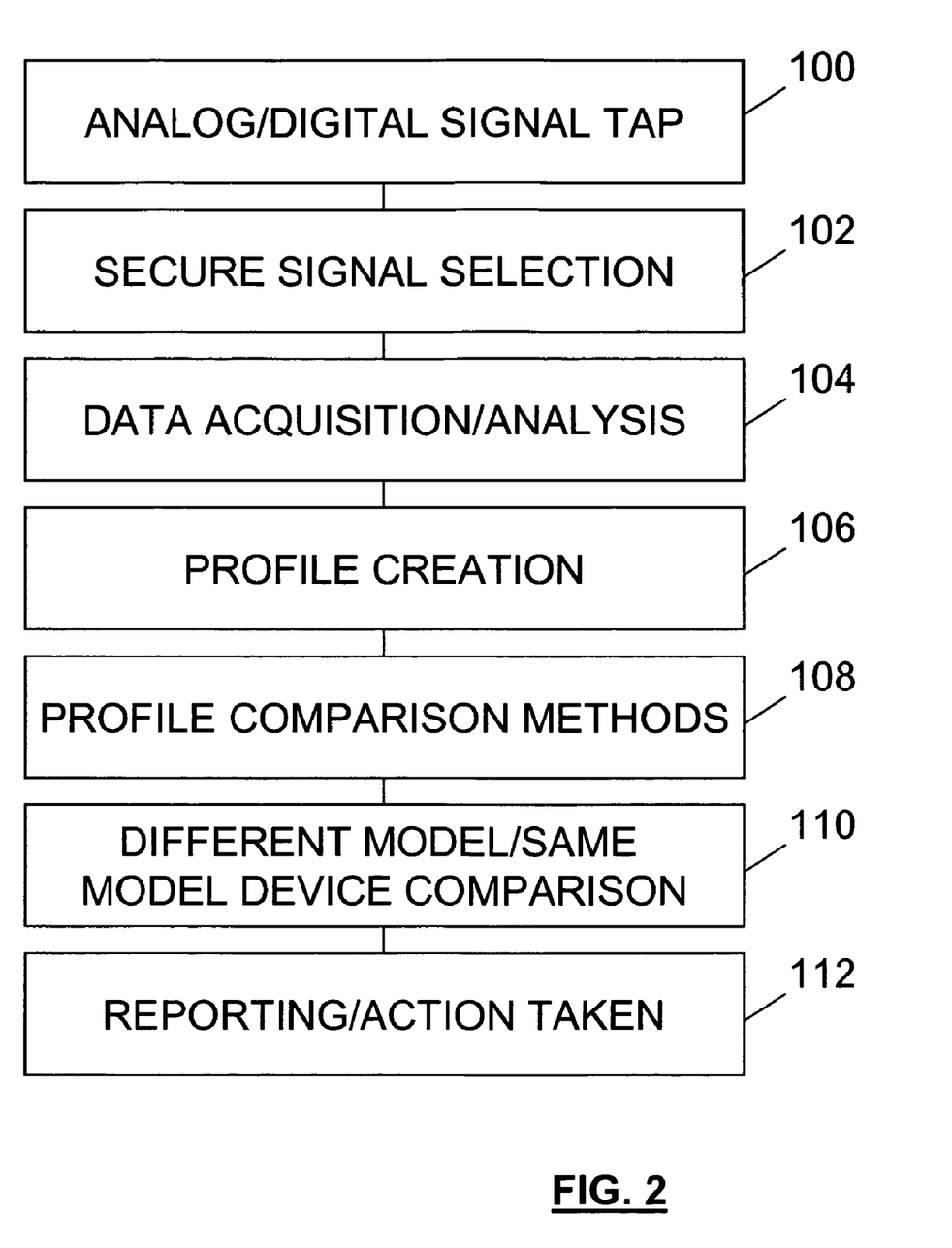
FIG. 2 is a flow diagram showing one embodiment of the methodology of the present invention.

FIG. 2 illustrates one embodiment of the methodology of the present invention. In FIG. 2, an analog/digital signal tap is taken in step 100. Next, secure signal selection occurs in step 102. Data acquisition and analysis is performed in step 104. Profile creation occurs in step 106. In step 109 profile comparison methods are used. In step 110, different model or same model device comparisons are made. In step 112, reporting and or appropriate action is taken.

In one embodiment of the present invention, an analog tap is taken in step 100. The analog tap is a high impedance line tap. A passive tap is used on a typical Ethernet network interface controller (NIC). The tap is taken at the computer side of the NIC transformer. The tap must deal with differential Ethernet signaling (RCV+ and RCV−). The center tap is preferably coupled to ground. The difference between the RCV+ and RCV− signals is recorded. In the current embodiment, a 1 Megohm tap was monitored using a Tektronix TDS 3054 digitizing oscilloscope. A voltage magnitude trigger was used but other trigging methods are possible. For example intelligent triggering on a known characteristic of the waveform. In one approach, a digital signal is verified by a time domain comparison to a known good signal.

Figure 3:
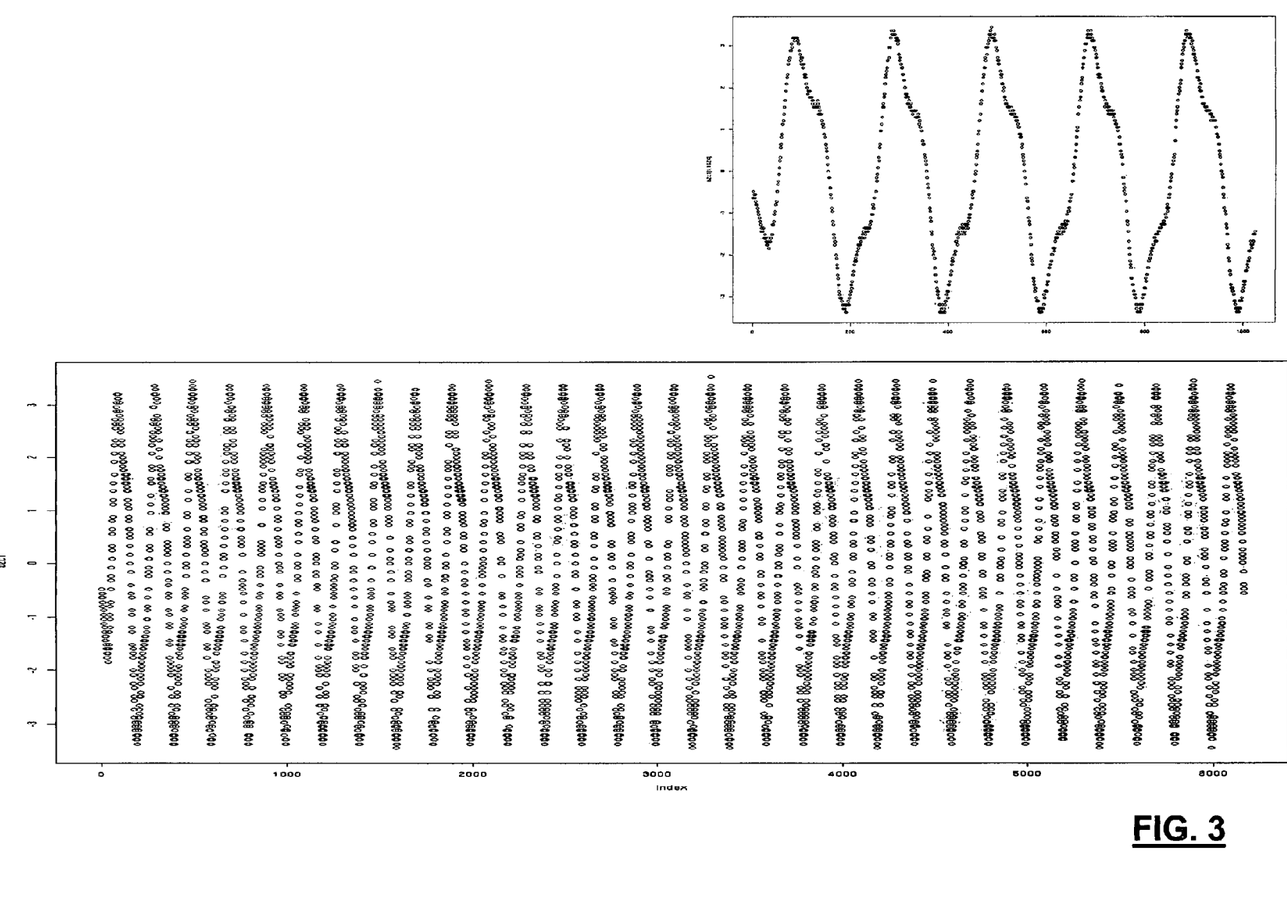
FIG. 3 is a diagram showing a signal from a 10 Mb Ethernet embodiment of the present invention.

FIG. 3 illustrates signal selection according to one application of the present invention for 10 Mb Ethernet. In FIG. 3, an Ethernet signal is shown. The signal selected is the Ethernet preamble. The Ethernet preamble is required to successfully send network traffic and the Ethernet preamble includes the same digital value in every frame. Thus, the Ethernet preamble is an excellent candidate for signal selection.

Figure 4:
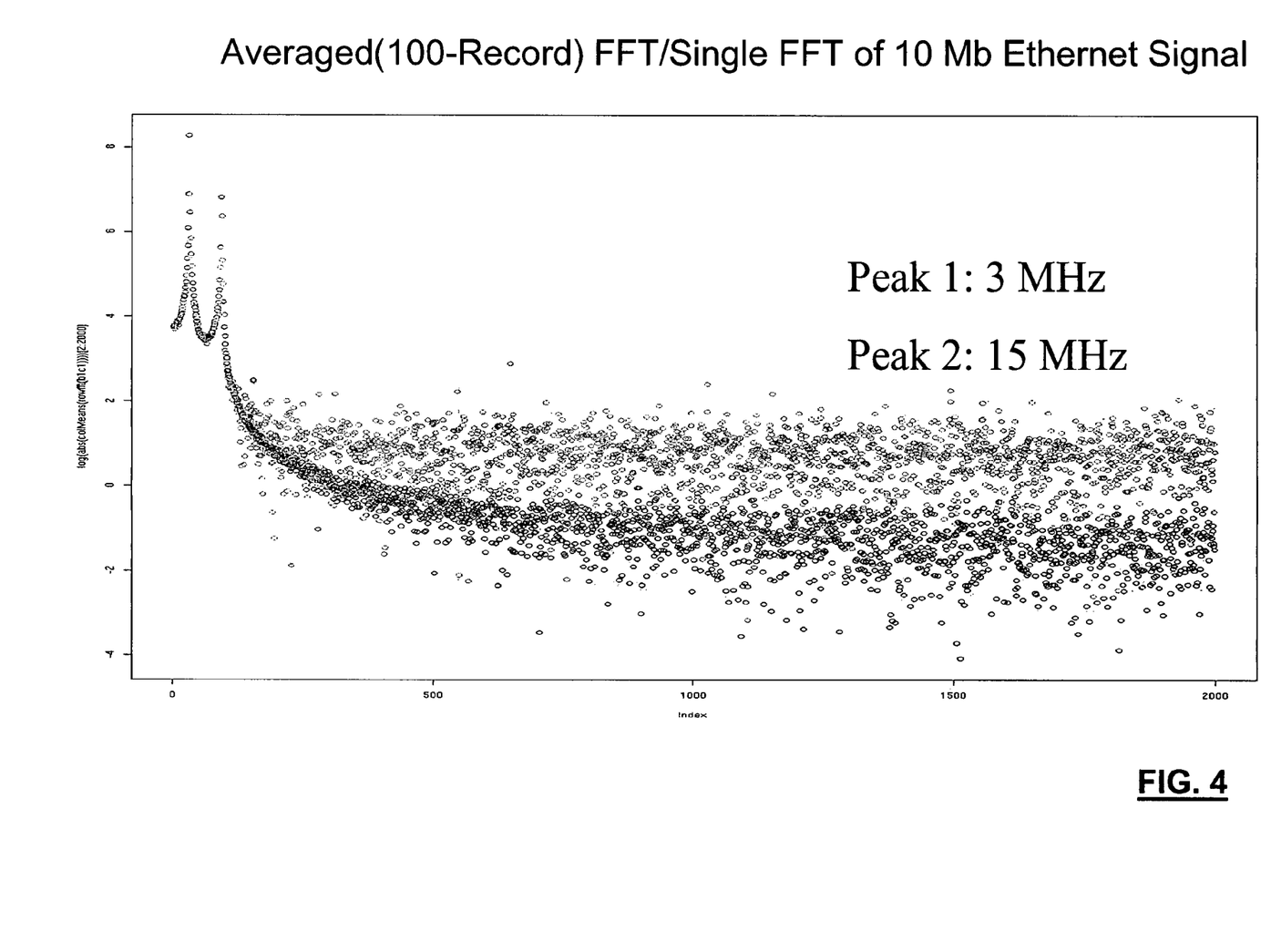
FIG. 4 is a diagram comparing a single-record FFT to a 100-record averaged FFT for a 10 Mb Ethernet signal according to one embodiment of the present invention.

FIG. 4 illustrates results of data acquisition and analysis. In FIG. 4, the upper graph is of a single FFT of a 10 Mb Ethernet signal with a first peak at 3 MHz and a second peak at 15 MHz. The lower graph is of the FFT of an average of 100 records.

Figure 5:
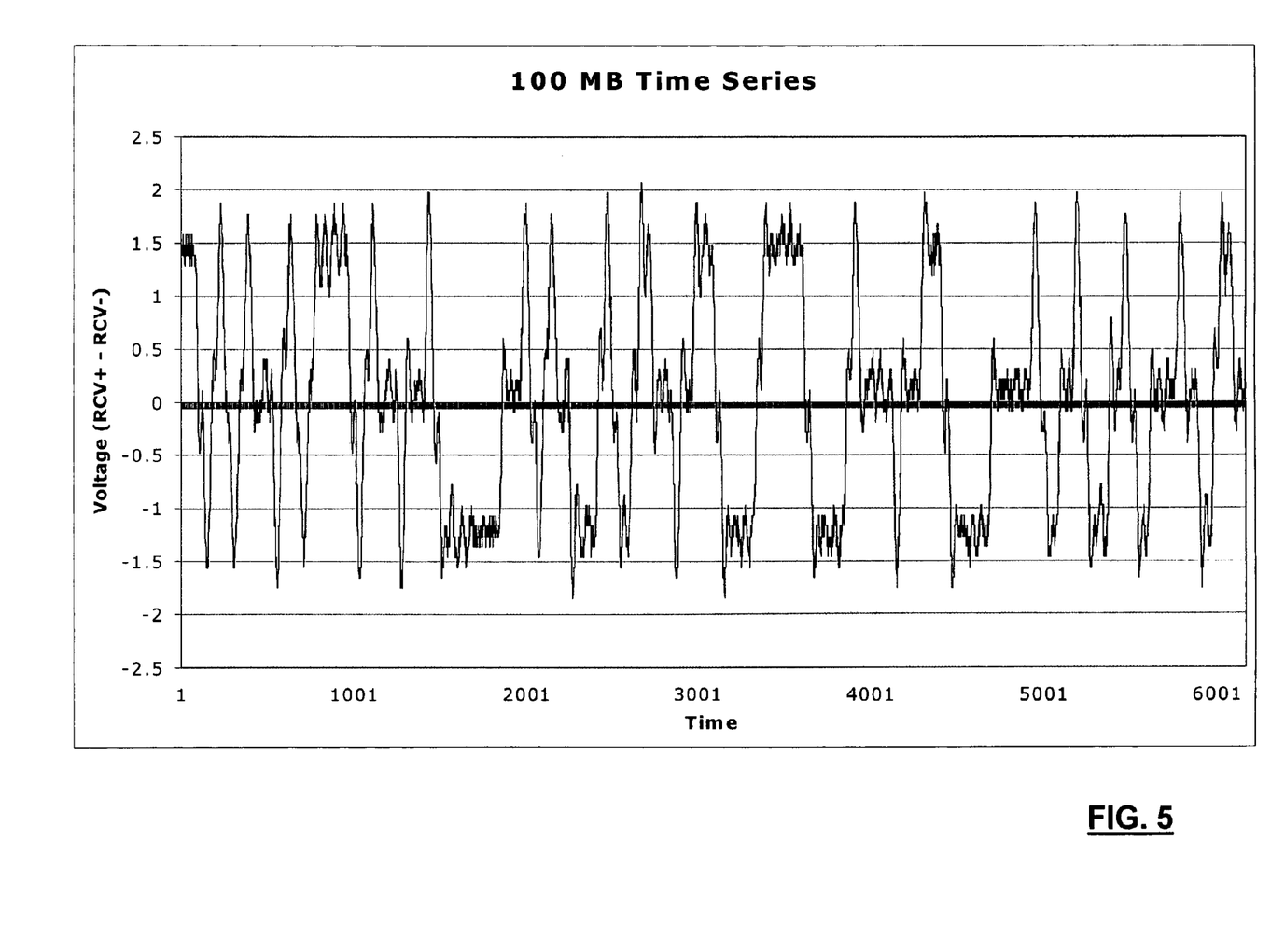
FIG. 5 is a diagram showing a signal from a 100 Mb Ethernet embodiment of the present invention.

Of course, the present invention also provides for the use of 100 Mb Ethernet or even 1 Gb signaling as well. 100 Mb Ethernet signaling is 3 level signaling that uses direct sequence spread spectrum (1 spread bit/data bit) with an 8191 bit period. It uses a continuous synchronization signal. The tap is similar to that used in 10 Mb Ethernet, but triggering is different. A pulse width trigger finds a point corresponding to a long sequence of 1's in the DSSS code. A software comparison verifies that triggering is on the same digital data. In implementation, the digital decoder of the controlled device can provide this function. FIG. 5 illustrates a 100 Mb Ethernet signal. It should be appreciated that with the 100 Mb signal, there are certain additional issues. For example, the period of the sync signal may be too long to capture a complete period. In particular, the period may be 3*3181 bit lengths (due to 3 level signaling and DSSS code length of 3181). Where this period is too long for capturing (for example, when using a digitizing device having a limit of 10K samples), only the beginning of the signal is captured.

Data acquisition and analysis can use a signal model. Such as:

$$a(i)=s(i)+h(i)+h'(i)+n(0) \text{ at time } i$$

where
    s is the expected ideal signal (conforming to the protocol digital specification);
    h is the model-specific signal perturbations (results from design of device);
    h' is the item-specific signal perturbations (results from variances in component specifications, manufacturing process, etc. and is likely dependent upon on h; and
    n is the noise due to sampling an transmission which may be assumed to be additive white Gaussian noise and digitization noise which are both independent of the other signals.

Profile creation and comparisons were made using a Differential Fourier Fingerprint (DFF). The DFF results indicate that the methodology can detect most off-model cards as intruders using one data record, but errors are frequent. The performance degrades when cards are of the same model with there being a high false reject rate. The DFF was extended by averaging spectra of repeated signal records. Using 15 record averages dramatically reduced false reject rates. Using 100 record (Ethernet frames) averages further reduced false reject rates. This embodiment effectively discriminated the same model of Ethernet cards, even those within 100 serial numbers. Some false rejects were still present as well as a few false accepts.

Figure 6:
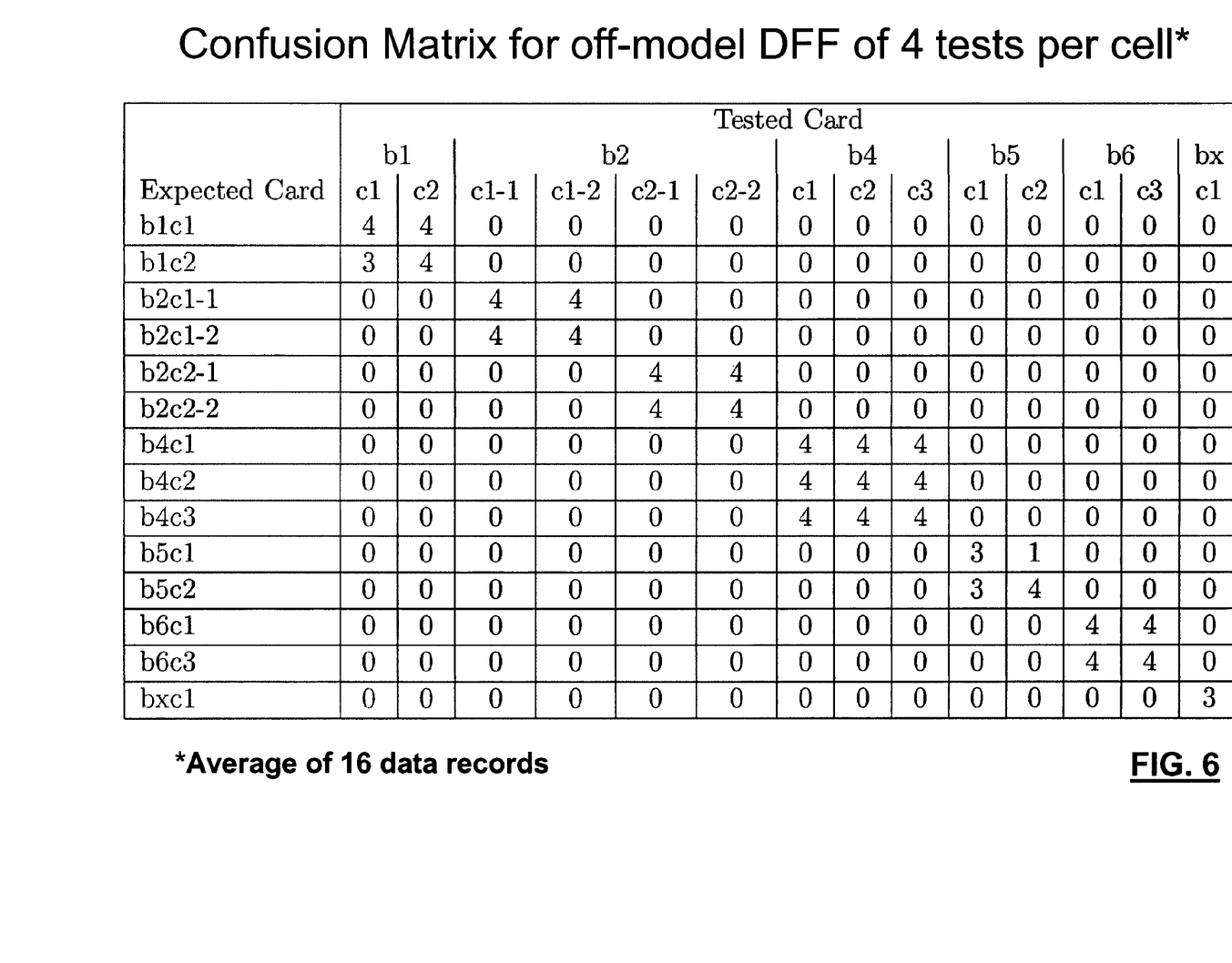
FIG. 6 is a confusion-matrix table showing results from the testing of a 10 Mb Ethernet embodiment of the present invention using an off-model Differential Fourier Fingerprint (DFF) according to one embodiment of the present invention.

FIG. 6 illustrates a confusion matrix for evaluating technique behavior. The DFF results are for a 10 Mb Ethernet card that is off-model with 4 tests per cell. Each of the test records is an average of 16 data records.

Figure 7:
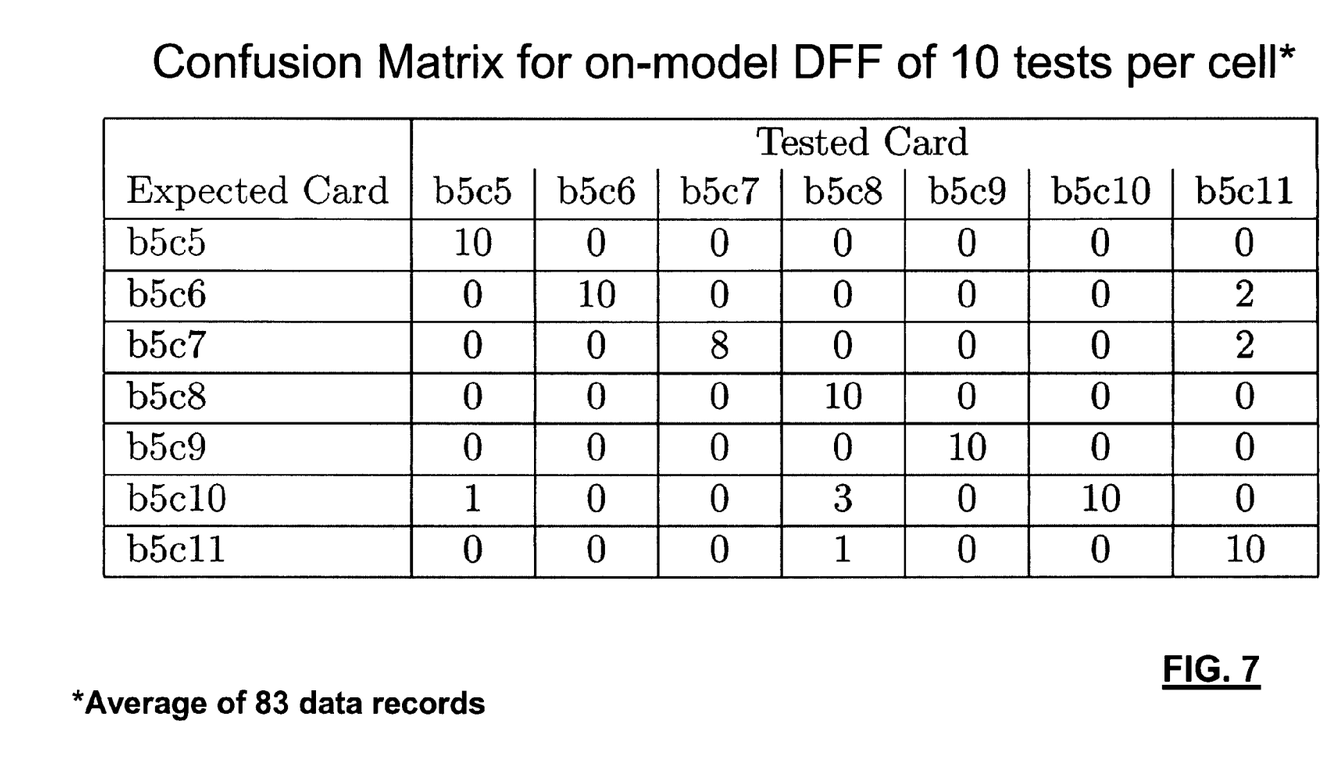
FIG. 7 is a confusion-matrix table showing results from the testing of a 10 Mb Ethernet embodiment of the present invention using an on-model Differential Fourier Fingerprint (DFF) according to one embodiment of the present invention.

FIG. 7 illustrates a confusion matrix for evaluating technique behavior for the same-model DFF with 10 tests per cell, each averaged from 83 records.

Thus, the results shown in FIGS. 6 and 7 validate the approach of the present invention. It should be appreciated that DFF is a type of sequential testing with certain limitations. In particular, DFF requires a preset amount of averaging. An insufficient amount of averaging could lead to missed attacks (false accepts). Too much averaging could lead to delayed detection. Sequential tests can be used to report an intruder on a network as soon as possible. The reports would preferably be generated as soon as enough evidence is available. Sequential testing is based on the idea that there are two statistical thresholds and the system begins in an uncertain state. As more signals are observed, the system would eventually cross one of these thresholds. Crossing one of the thresholds indicates that a test has accepted the device as the one expected. Crossing the other indicates that the subject device is an attacker. Generally, this is a univariate approach. The methodology of this embodiment works well for off-model cards regardless of the wide variety of frequency bins which can be used as the tested variable. The test is against a mean valued of the magnitude of a given bin of the spectrum. One variable is not sufficient in this approach for on-model cards. The present invention contemplates improving sequential testing through any number of approaches, such as through enhanced feature selection, multivariate sequential tests, voting procedures, and other variations of sequential testing.

Magnitude spectrum bin distributions can also be used. Instead of data record averaging, histograms are accumulated for each magnitude spectrum bin. Then each bin in a profile is compared to another set of data using the Kolmogorov-Smirnov Tests with 95 percent confidence. Then, take the resulting vector as a binomial distribution (p=0.05), and test. Using this approach, decisions with high confidence can be obtained using as few as 15 data records instead of the 100 data records used in the DFF approach. Sequential testing can be applied to this binomial test as well.

According to another embodiment of the present invention, a fingerprint is comprised of a vector of histograms of the power levels in a set of discrete frequency ranges. Each element of the vector is a set of power measurements as computed in the Fourier fingerprint. We compare each element of the vector to the corresponding histogram's measures from a subject device using a rating statistic such as the Kolmogorov-Smirnov Test. Then we compare the resulting tests across the vector using a binomial distribution linked to the confidence parameter from the Kolmogorov-Smirnov Test.

The present invention contemplates that any number of approaches may be used for signal differentiation according to the framework of the present invention. In one alternative approach to signal differentiation, the present invention makes use of an optimal detector, the matched filter. The transfer function of the matched filter in the frequency domain at sampling time $t_0$ may be stated as:

$$H(\omega) = \kappa \frac{A(\omega)}{P(\omega)} e^{-j\omega t_0} \quad (1)$$

Where $A(\omega)$ is the Fourier Transform of a known time-domain signal $\alpha(t)$, $P(\omega)$ is the power spectral density (PSD) of the noise associated with an input signal, and is an arbitrary constant. By selecting an appropriate value of $\kappa$ for the operating environment, and assuming Gaussian noise for the PSD, $P(\omega)$ may be eliminated from (1). For a given input signal, $\beta(t)$, the output of the filter, M at sampling time $t_0$, in the Gaussian noise case is then defined as:

$$M = H(\omega)B(\omega) = A(\omega)B(\omega)e^{-j\omega t_0} \quad (2)$$

Where $B(\omega)$ is the Fourier Transform of the time-domain input signal $\beta(t)$.

The matched filter approach for one embodiment of the present invention involves the selection of a reference signal, $\epsilon(t)$, from a set of measured data—henceforth data sets—representing the time-domain electrical signal from a known device. Each data set is comprised of several records, which are the measurements of a devices' electrical signal over successive data acquisition trials. A reference signal may be represented by a single, multiple, or an average of several, records from a data set. The Fourier Transform of this reference signal, however it is chosen, serves as the known signal, $A(\omega)$, for the transfer function defined by (1).

A baseline for the known device is created by applying the matched filter to each record of its data set. The same filter used to create the baseline for the known device is then applied to each record of a data set for a different device—henceforth the test device—to create a baseline for the test device, when matched to the known device. These two baselines are then compared to see if an appreciable difference exists. When a difference is discernible we are able to differentiate the devices, when no significant difference is observed we are unable to differentiate the devices. As the sampling nature of the hardware used to acquire the analog signals under investigation does not allow for a precise initial measurement point of each signal over successive trials, our implementation of the matched filter uses a convolution based approach, which optimally aligns a known signal, $\alpha(t)$ to an input signal, $\beta(t)$, and then performs the matched filter operation. The output of our filter, $\mu$, is then given as:

$$\mu = \max(a(-t) * \beta(t)) \quad (3)$$

Where * denotes the convolution operation. Thus, the output of filter for the $i^{th}$ record of the reference devices' data set, $\eta(t)$, is defined as:

$$\mu_{Ref}^i = \max(\epsilon(-t) * \eta^i(t)) \quad (4)$$

While the output of filter for the $i^{th}$ record of the test devices' data set, $\gamma(t)$, is defined as:

$$\mu_{Test}^i = \max(\epsilon(-t) * \gamma^i(t)) \quad (5)$$

The efficacy of the matched filter approach relies upon the correct selection of the reference signal. The reference signal may be an arbitrarily chosen section of a repeating, or consistent, portion of a signal, the preamble of an Ethernet frame, for example. Algorithms may also be employed to find an optimal reference signal(s) with periods of differing length and positions within a record. By selecting more than one reference signal, each corresponding to unique sections of the signal, multiple filters may be built, and used in parallel, for optimal differentiation of similar signals. To further maximize filter performance, pre-processing may be performed on each record within a data set. An example of such pre-processing includes the use of bandpass filtering, and the reduction of certain segments of a record to a value of zero, both of which improve error performance.

Thus, the matched filter fingerprint provides for generating a device fingerprint as the parameters of an ensemble of matched-filter correlators and their output statistics. The filter-correlators may be based on separate time segments of the subject device's signals so as to increase the separability of similar devices. A fingerprint comparison method can then be used to evaluate the filters on incoming signals and compare their output to the statistics determined from the device fingerprints.

The present invention also provides for methods of tracking signatures. It is contemplated that for some subject devices, their signaling behavior may vary slowly over time, a characteristic called drift. To account for this drift, a history of signals (and/or their statistics) is maintained that pass our checks and after an appropriate period of time the history is used to either create a new fingerprint or update the previous one. This can be performed by updating either the stored signals or the comparison statistics.

Returning to FIG. 1, it is to be understood that the present invention that FIG. 1 illustrates direct communication between a Controlled Device 16 and multiple subject devices 12 over some media 14. One approach of the present invention is based on the common situation where we have a one-to-many communication relationship between a controlled device and a number of subject devices over some media. The table below shows four example configurations that may be used according to the present invention. In each of these situations, we have a relatively expensive controlled device (e.g. an Ethernet switch) that may service many subject devices (e.g., PCs with Ethernet interfaces). Furthermore, we can formulate security policies that we expect the controlled device to enforce based on the identity of the subject device. Of course, the present invention is not to be limited to the specific subject devices, controlled devices, or media expressly listed in the table below.

| Subject Device | Controlled Device | Media |
| --- | --- | --- |
| Ethernet Interface Cards (10,100,1000) | Ethernet Switch | Twisted Pair |
| 802.11 Wireless LAN Cards | 802.11 Access Point | Wireless |

-continued

| Subject Device | Controlled Device | Media |
|---|---|---|
| Wired Smart Cards | Physical Contact Card | Direct |
| Wireless Smart Cards | Wireless Card Reader | Wireless |

Our key assumption about the controlled device is that it is physically secure and hence not subject to physical tampering. We also assume that it is possible to read the digital data from the controlled device 16 either through a preexisting interface or by decoding—the analog-data—captured by the Analog Tap. The controlled device 16 may be managed by some management interface (e.g. Simple Network Management Protocol (SNMP) or a dedicated serial management interface). For instance, the module 22 of the present invention could cause the system to filter the traffic of a detected intruder by sending SNMP messages. Finally, we assume that it is possible to create an Analog Tap 24 that allows us to make high fidelity measurements of the signals while not interfering with the digital transmissions between Subject 12 and Controlled Devices 16.

Wired Networks

In wired networks, the present invention provides for the characterization necessary to detect malicious taps of network media, replacement of equipment, and changes in the configuration of equipment. By collecting our data at a controlled device 16 such as an Ethernet switch, a module 22 can monitor numerous subject devices. An example of an application in this area would be to detect employees replacing authorized systems on the network with unauthorized computers. Such behavior can lead to the introduction of worms and other malicious code in networks that are isolated from public networks.

Wireless Networks

In wireless networks, such as 802.11b/Wi-Fi networks, authentication protocols such as wired equivalent privacy have had numerous problems recently. Furthermore, it is common for wireless access points to be purposely left open to the public. In both of these cases, alternative methods for identifying and authenticating wireless devices would be useful. In the case of open wireless access point, a module 22 could record fingerprints for all Wi-Fi cards that use it during a time window. If an attack is traced back to that access point, further measurements could be made of a suspect's equipment so as to link the suspect to the "scene of the crime." In wireless LANs, wardriving—surveying an area for insecure wireless networks by listening for their signals—has become quite popular. Often individuals use high gain antennas and access the network from atypical locations either as a means of accessing the internal network of an organization or for unauthorized Internet access. Examination of multipath signal characteristics as well as signal strength can be used for detecting such illicit use.

Smart Cards

The present invention can also be applied to smart cards such as the ISO ID-1 plastic identification card which is very much like a typical credit card or the ISO 7816-2 standard which has eight electrical contacts (6 are used). The later card is powered by the contacts and sends and receives electrical communication signals through the contacts. The first type uses inductive loop technology where the card is powered by a magnetic field and sends and receives communication signals electromagnetically.

Despite claims of tamper resistance and inherent physical security, clever attackers have found ways to retrieve smart card secret keys and subvert their security. In these cases, an attacker can clone a smart card—essentially making a fully functional copy of the original device. A fingerprint of these cards can be used for detection of cloned cards and also potentially for forensic purposes.

RFID Devices

The present invention can also be applied to RFID devices. RFID technology uses RFID tags or transponders in conjunction with a reader to communicate information over a wireless link. Thus, the subject devices 12 in FIG. 1 can be RFID tags or transponders and the controlled device 16 shown in can be an RFID reader, the media 14 being a wireless media. The information can range in size from one bit to currently several kilobytes. RFID devices can operate at various frequencies, including at least as low as 100 kHz and up to around 6 GHz.

As the name would imply, RFID devices for identification purposes, thus some of the same concerns about security present in other embodiments of the invention are also present when using RFID devices. RFID devices are frequently used in security passes, inventory tracking systems and similar applications. Some of the security problems associated with other types of digital devices become even more concerning in the context of RFID tags. Consider, for example, that the current encryption techniques which are not even always used in RFID tags, provide only weak encryption—such as only 8-bit encryption.

Thus, in one embodiment of the present invention, RFID tags are fingerprinted. Even when one RFID tag device is programmed to replicate another physical RFID tag device, the fingerprint can distinguish the tags. The advantages of the present invention become even more apparent in the RFID context due to the limitations of software-based solutions. Fingerprinting of the RFID tags can be used, and security can be increased without upgrading or otherwise increasing the complexity of the tags themselves. Thus, the same tags can be used in both low security applications as well as high security applications. It should also be further appreciated that the number and quality of characterizations of an RFID tag can be increased in order to improve upon security. Thus even as attempts at hacking RFID tags become more common or more sophisticated, there is the possibility of adding new or additional security countermeasures through increasing the number, type, and/or quality of characterizations of an RFID tag.

The present invention contemplates the methodologies, apparatus, and systems of the present invention can be implemented in numerous ways. Numerous types of digital devices can be used, various properties of a communication can be examined, any number of types of analysis can be used, and a variety of security features can be implemented. Therefore, the present invention is not to be limited to the specific disclosure provided herein.

What is claimed is:

1. A method of providing security associated with communications from a digital device, comprising:
accessing an analog signal associated with communications from the digital device through a passive analog tap;
observing the analog signal associated with communications from the digital device;
characterizing the digital device at least partially based on the analog signal;
providing a security feature at least partially based on the step of characterizing.

2. The method of claim 1 wherein the security feature is an intrusion detection security feature.

3. The method of claim 1 wherein the security feature includes forensic data collection.

4. The method of claim 1 wherein the security feature includes authentication.

5. The method of claim 1 wherein the security feature includes identification.

6. The method of claim 1 wherein the security feature includes failure detection.

7. The method of claim 1 further comprising tracking changes in characteristics of the digital device over time.

8. The method of claim 1 wherein the step of characterizing comprises analyzing the analog signal.

9. The method of claim 8 wherein the analyzing includes performing signature analysis.

10. The method of claim 8 wherein the analyzing includes performing pattern recognition.

11. The method of performing pattern recognition of claim 10 wherein the step of performing pattern recognition includes applying at least one of a set of techniques comprising cross-correlation comparison, amplitude and power spectrum comparison, matched filter detection, wavelet analysis, and differential spectral analysis.

12. The method of claim of claim 8 wherein the analyzing includes using Kolomogorov-Smirnov tests.

13. The method of claim 8 wherein the analyzing includes analytic modeling of signal components and signature behavior.

14. The method of claim 1 wherein the digital device is selected from a set comprising a network hub, a network switch, a network card, a wireless network card, a wireless access point, a smartcard, a smartcard reader, an RFLD tag, and an REID reader.

15. The method of claim 1 wherein the step of characterizing includes characterizing the digital device by manufacturer and model.

16. The method of claim 1 wherein the step of characterizing includes characterizing the digital device as being authorized or unauthorized.

17. An apparatus for providing security related to communications from a digital device, comprising:

an analog tap configured to provide access to an analog signal associated with outputs of the digital device;

a signal analysis component for providing an analysis of the analog signal associated with the digital device and accessed through the analog tap, wherein the analysis includes determining characteristics of the digital device based on the analog signal;

a decision component for characterizing the analysis of the analog signal associated with the digital device and determining whether or not to activate a security feature based on policy functions.

18. The apparatus of claim 17 wherein the signal analysis component is partially implemented in software.

19. The apparatus of claim 17 wherein the signal analysis component is partially implemented in hardware.

20. The apparatus of claim 19 wherein the hardware includes a signal digitizer.

21. The apparatus of claim 17 wherein the decision component is at least partially implemented in software.

22. A system for providing security, comprising:

a controlled device having a controlled interface to a medium, the controlled interface comprising an analog tap;

an analog-to-digital converter operatively connected to the controlled interface for receiving an analog signal and providing digital samples;

a data selection and reduction component operatively connected to the analog-to-digital converter for receiving the digital samples and selectively storing selected or reduced digital samples within a storage component;

an analysis component for analyzing the digital samples and determining characteristics of the controlled device based on the digital samples;

a policy component for making decisions based on output from the analysis component.

23. The system of claim 22 wherein the analysis component is adapted to access historical data stored in the storage component.

24. The system of claim 22 wherein the controlled device is a network device.

25. The system of claim 24 wherein the networked device is an Ethernet network device.

* * * * *

UNITED STATES PATENT AND TRADEMARK OFFICE
CERTIFICATE OF CORRECTION

PATENT NO. : 7,639,806 B2  Page 1 of 1
APPLICATION NO. : 11/087365
DATED : December 29, 2009
INVENTOR(S) : Daniels et al.

It is certified that error appears in the above-identified patent and that said Letters Patent is hereby corrected as shown below:

Col. 13, Claim 14, Line 33:
DELETE after an "RFLD"
ADD after an --RFID--

Col. 13, Claim 14, Line 34:
DELETE after an "REID"
ADD after an --RFID--

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,639,806 B2  Page 1 of 1
APPLICATION NO. : 11/087365
DATED : December 29, 2009
INVENTOR(S) : Daniels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1316 days.

Signed and Sealed this

Ninth Day of November, 2010

David J. Kappos
*Director of the United States Patent and Trademark Office*